US008523396B2

(12) United States Patent
Chung

(10) Patent No.: US 8,523,396 B2
(45) Date of Patent: Sep. 3, 2013

(54) DEVICE HOUSING

(75) Inventor: Chia-Chi Chung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 265 days.

(21) Appl. No.: 13/212,203

(22) Filed: Aug. 18, 2011

(65) Prior Publication Data
US 2012/0133252 A1    May 31, 2012

(30) Foreign Application Priority Data
Nov. 29, 2010   (CN) .......................... 2010 1 0567644

(51) Int. Cl.
*F21V 33/00* (2006.01)
(52) U.S. Cl.
USPC ...... 362/259; 362/374; 362/362; 362/249.02; 174/560; 174/563
(58) Field of Classification Search
USPC ................... 362/259, 362, 374, 375, 249.02; 174/560, 563
See application file for complete search history.

(56) References Cited

U.S. PATENT DOCUMENTS

| | | | |
|---|---|---|---|
| 3,641,793 A | 2/1972 | Van Dalen | |
| 4,376,379 A | 3/1983 | Gotanda | |
| 7,819,551 B2 * | 10/2010 | Ward | 362/249.01 |
| 2010/0302777 A1 * | 12/2010 | Knoll et al. | 362/235 |
| 2012/0020086 A1 * | 1/2012 | Kataoka | 362/249.02 |

FOREIGN PATENT DOCUMENTS

| | | |
|---|---|---|
| TW | M377045 | 3/2010 |
| TW | 201019032 | 5/2010 |

* cited by examiner

*Primary Examiner* — Laura Tso
(74) *Attorney, Agent, or Firm* — Jianq Chyun IP Office

(57) ABSTRACT

A device housing includes first and second cases, a first magnetically sensitive positioning pin, and a first compressible member. The first case has a first protruding block having a first positioning hole. The second case has a first groove having a second positioning hole. When the first protruding block is disposed in the first groove, the first positioning hole is aligned with the second positioning hole. The first magnetically sensitive positioning pin runs through the first and second positioning holes to position the second case on the first case. The first compressible member is disposed in the first positioning hole and between an inner wall of the first positioning hole and the first magnetically sensitive positioning pin. When a first magnetic force acts on the first magnetically sensitive positioning pin, the first magnetically sensitive positioning pin compresses the first compressible member and moves away from the second positioning hole.

10 Claims, 6 Drawing Sheets

DEVICE HOUSING

CROSS-REFERENCE TO RELATED APPLICATION

This application claims the priority benefit of China application serial no. 201010567644.0, filed Nov. 29, 2010. The entirety of the above-mentioned patent application is hereby incorporated by reference herein and made a part of specification.

BACKGROUND OF THE INVENTION

1. Field of the Invention

The invention relates to a device housing, and in particular, to a device housing of a light source.

2. Description of Related Art

A projector is a display device for producing large-size images. An imaging principle of the projector is to convert an illuminating beam produced by a light source module to an image beam through a light valve, and projecting the image beam to a screen or a wall through a lens, to form an image. With the progress of the projecting technology and the reducing of the manufacturing cost, the use of the projector has been expanded from commercial use to domestic use.

The projector may provide light rays needed for projection with a light emitting diode (LED) light source or a laser light source. Taking the laser light source as an example, a laser light source module of the projector on the market could be easily detached, such that people with bad intention may take out the laser light source for other use, which may hurt the human body. Therefore, if the laser light source has such a design that the laser light source could only be detached in a particular manner, the situation that the laser light source is taken out for other use could be prevented.

In Taiwan Patent No. 201019032, a laser projecting system is disclosed, which consists of multiple laser light sources, a light convergence module, an image generation module, a lens, a diffusion module, and a projection lens. In Taiwan Patent No. M377045, a fixing module is disclosed, which is used for fixing a device housing by means of a magnetic force of a magnet. In U.S. Pat. No. 3,641,793, it discloses an approach to fix two parts by a magnet. In U.S. Pat. No. 4,376,379, a technology for releasing a fixing status of two components by a magnetic force is disclosed.

SUMMARY OF THE INVENTION

The invention is directed to a device housing, which is capable of being detached through a magnetic force.

Other objectives and advantages of the invention could be further understood from technological features disclosed in the invention.

To achieve one, part, or all of the above objectives, or other objectives, an embodiment of the invention provides a device housing, which includes a first case, a second case, a first magnetically sensitive positioning pin, and a first compressible member. The first case has a first protruding block. The first protruding block has a first positioning hole. The second case has a first groove. The first groove has a second positioning hole. When the first protruding block is disposed in the first groove, the first positioning hole is aligned to the second positioning hole. The first magnetically sensitive positioning pin runs through the first positioning hole and the second positioning hole, to position the second case on the first case. The first compressible member is disposed in the first positioning hole. The first compressible member is disposed between an inner wall of the first positional hole and the first magnetically sensitive positioning pin. When a first magnetic force acts on the first magnetically sensitive positioning pin, the first magnetically sensitive positioning pin compresses the first compressible member and moves away from the second positioning hole.

In the device housing, the first case has at least one accommodating groove, the second case has an opening, a light source is disposed in the accommodating groove, and the opening exposes the light source.

In the device housing, the light source is a laser light source.

In the device housing, the second case has a pinhole. When the first magnetically sensitive positioning pin runs through the first positioning hole and the second positioning hole, an end of the first magnetically sensitive positioning pin is aligned to the pinhole, and a screw is screwed into the pinhole and abuts against the first magnetically sensitive positioning pin.

In the device housing, the first compressible member is a spring or an extension rod.

In the device housing, the second positioning hole is formed on an inner wall of the first groove.

In the device housing, the second case has a lug in the first groove, and the second positioning hole is formed on the lug.

In the device housing, an end of the first protruding block is even with an edge of the first case, and an end of the first groove is even with an edge of the second case.

The device housing further includes a second magnetically sensitive positioning pin, and a second compressible member. The first case further has a second protruding block, the second protruding block has a third positioning hole; the second case further has a second groove, and the second groove has a fourth positioning hole. When the second protruding block is disposed in the second groove, the third positioning hole is aligned to the fourth positioning hole; the second magnetically sensitive positioning pin runs through the third positioning hole and the fourth positioning hole to position the second case on the first case. The second compressible member is disposed in the third positioning hole. The second compressible member is disposed between an inner wall of the third positioning hole and the second magnetically sensitive positioning pin. When a second magnetic force acts on the second magnetically sensitive positioning pin, the second magnetically sensitive positioning pin compresses the second compressible member and moves away from the fourth positioning hole.

In the device housing, the first protruding block and the second protruding block are symmetrical about a geometric center of the first case, and the first groove and the second groove are symmetrical about a geometric center of the second case.

Based on the above, in the embodiments of the invention, the first magnetically sensitive positioning pin runs through the first positioning hole and the second positioning hole, and is positioned by the first compressible member. When a user intends to detach the first case and the second case, a magnetic force needs to act on the first magnetically sensitive positioning pin, such that the first magnetically sensitive positioning pin compresses the first compressible member and moves away from the second positioning hole, to release the fixation of the first case and the second case with the first magnetically sensitive positioning pin. Thus, the device housing could be easily detached.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
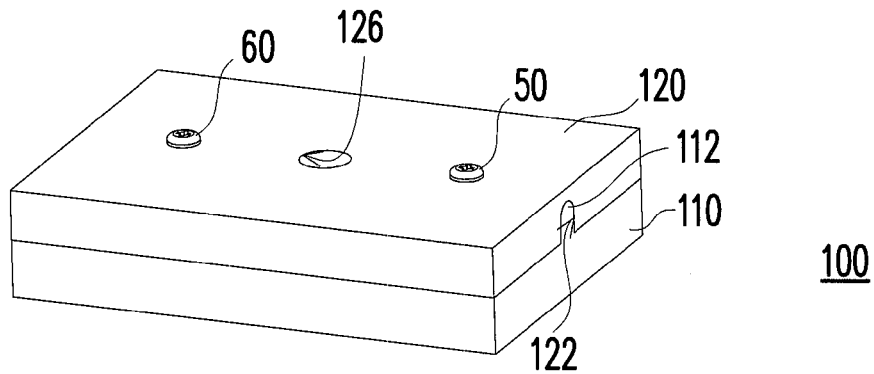
FIG. 1 is a three-dimensional view of a device housing according to an embodiment of the invention.
Figure 2:
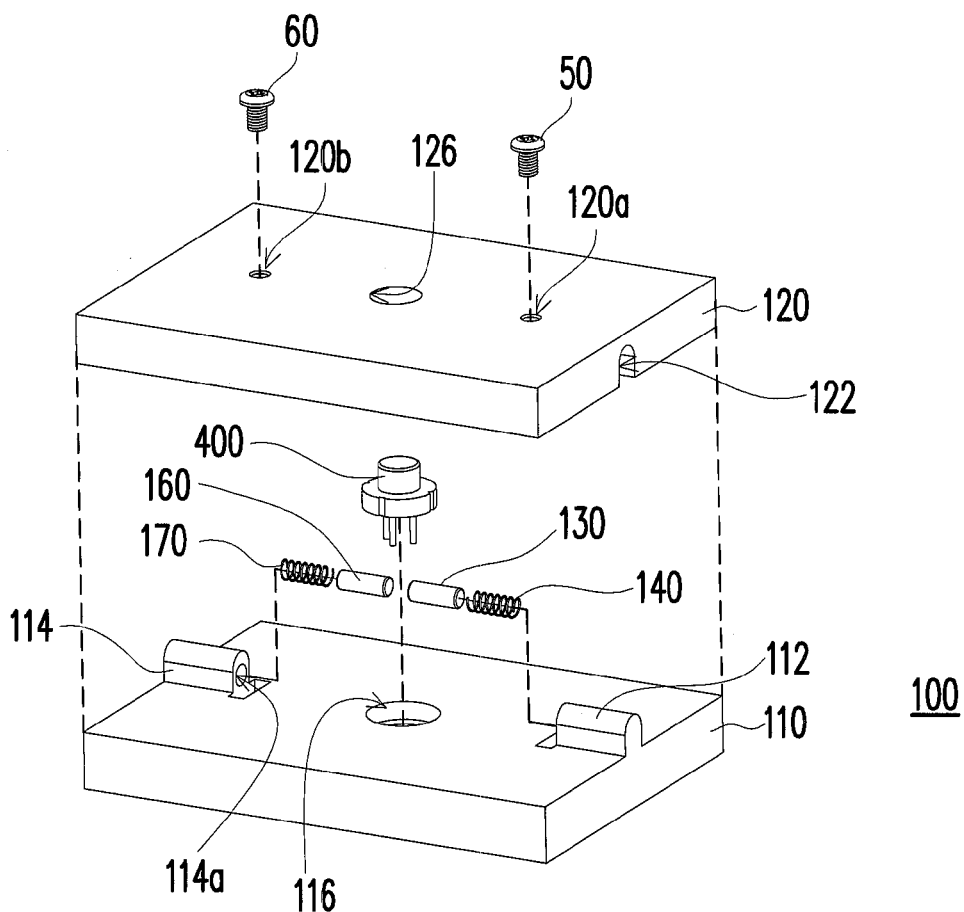
FIG. 2 is an exploded view of the device housing in FIG. 1.

FIG. 1 is a three-dimensional view of a device housing according to an embodiment of the invention. FIG. 2 is an exploded view of the device housing in FIG. 1. Referring to FIGS. 1 and 2, a device housing 100 of the embodiment includes a first case 110, a second case 120, a first magnetically sensitive positioning pin 130, and a first compressible member 140. The first case 110 and the second case 120 are fixed with each other through positioning of the first magnetically sensitive positioning pin 130 and the first compressible member 140, so as to fix a light source 400 applied to a projector, such as a laser light source or a point light source, between the first case 110 and the second case 120. Components and the action manner of the device housing 100 will be described in detail with reference to the drawings below.

Figure 3:
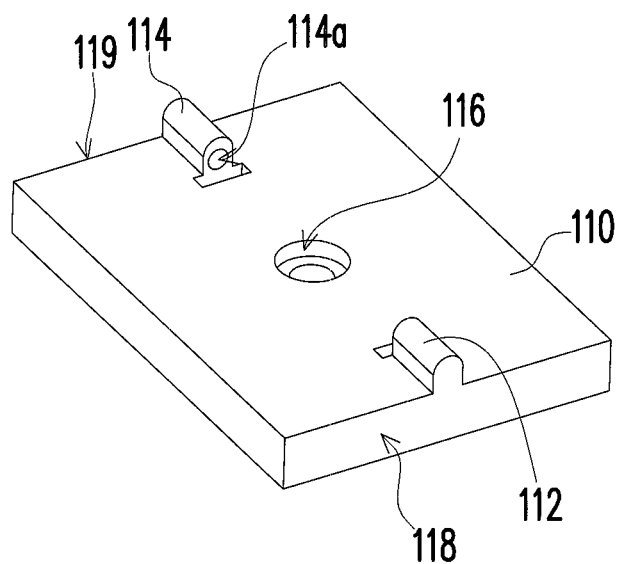
FIG. 3 is a three-dimensional view of a first case in FIG. 1.
Figure 4:
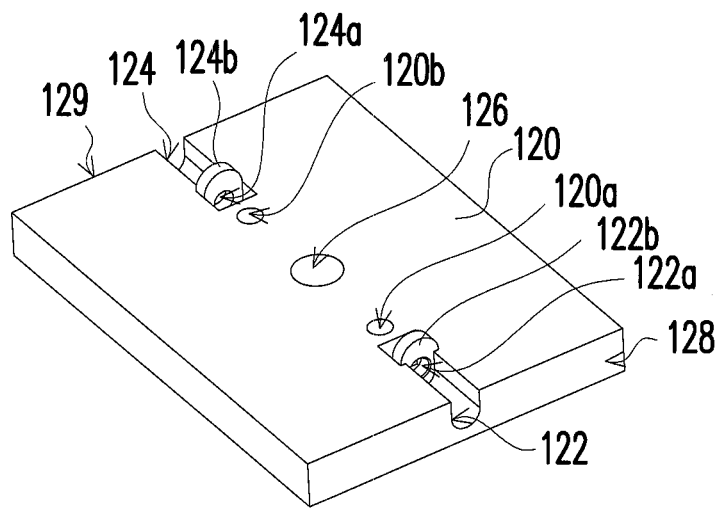
FIG. 4 is a three-dimensional view of a second case in FIG. 1.
Figure 5:
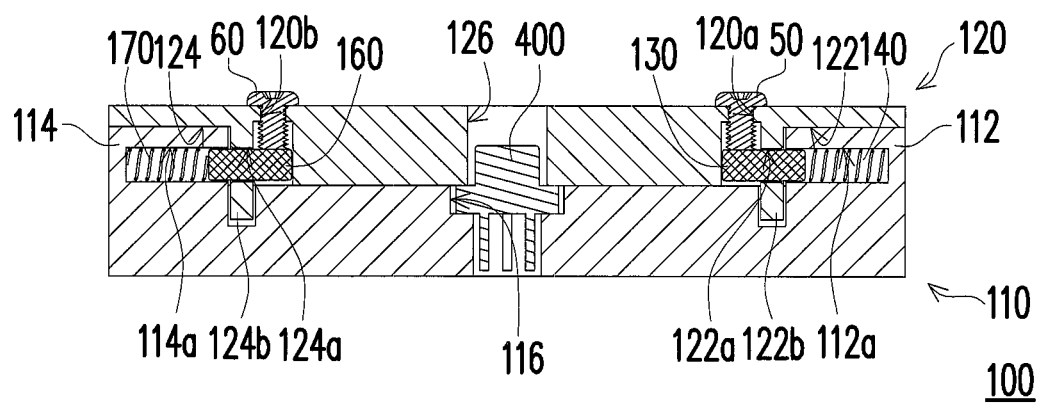
FIG. 5 is a cross-sectional view of the device housing in FIG. 1.

FIG. 3 is a three-dimensional view of a first case in FIG. 1. FIG. 4 is a three-dimensional view of a second case in FIG. 1. FIG. 5 is a cross-sectional view of a device housing in FIG. 1. Referring to FIGS. 3 to 5, the first case 110 of this embodiment has a first protruding block 112, and the first protruding block 112 has a first positioning hole 112a. The second case 120 has a first groove 122, and the first groove 122 has a second positioning hole 122a. The second case 120 is applied to cover the first case 110, as shown in FIG. 5, so as to fix the light source 400 between the first case 110 and the second case 120. When the second case 120 covers the first case 110, and the first protruding block 112 is disposed in the first groove 122, the first positioning hole 112a is aligned to the second positioning hole 122a.

The first magnetically sensitive positioning pin 130 runs through the first positioning hole 112a and the second positioning hole 122a, to position the second case 120 on the first case 110. The first compressible member 140 may be, for example, a deformable elastic material (a spring) or an extension rod, and is disposed in the first positioning hole 112a, and props between an inner wall of the first positioning hole 112a and the first magnetically sensitive positioning pin 130. When a user applies a magnetic force on the first magnetically sensitive positioning pin 130, the first magnetically sensitive positioning pin 130 compresses the first compressible member 140, moves towards inside of the first positioning hole 112a, and moves away from second positioning hole 122a. Specifically, when the first compressible member 140 is a spring-like elastic material, the first magnetically sensitive positioning pin 130 resists an elastic force from the first compressible member 140 and compresses the length of the spring, and moves toward a direction away from the second positioning hole 122a, to release the fixation of the first case 110 and the second case 120. When the first compressible member 140 is an extension rod, the extension rod is stretched or shortened with an external force. As for the embodiment, when a magnetic force in a proper direction is applied to the first magnetically sensitive positioning pin 130, the first magnetically sensitive positioning pin 130 compresses the first compressible member 140 and changes the length of the first compressible member 140, and moves away from the second positioning hole 122a. A material of the first magnetically sensitive positioning pin 130 of this embodiment may be, for example, a metal material attracted by the magnetic force, such as, iron, cobalt, and nickel.

In order to fix the second case 120 on the first case 110 more firmly, the device housing 100 of the embodiment further includes a second magnetically sensitive positioning pin 160 and a second compressible member 170. The first case 110 has a second protruding block 114, and the second protruding block 114 has a third positioning hole 114a. The second case 120 has a second groove 124, and the second groove 124 has a fourth positioning hole 124a. When the second case 120 covers the first case 110, and the second protruding block 114 is disposed in the second groove 124, the third positioning hole 114a is aligned to the fourth positioning hole 124a.

The second magnetically sensitive positioning pin 160 runs through the third positioning hole 114a and the fourth positioning hole 124a, so as to position the second case 120 on the first case 110. Similar to the first compressible member 140, the second compressible member 170 may be, for example, a spring or an extension rod, and is disposed in the third positioning hole 114a, and props between an inner wall of the third positioning hole 114a and the second magnetically sensitive positioning pin 160. When the user applies a magnetic force on the second magnetically sensitive positioning pin 160, the second magnetically sensitive positioning pin 160 compresses the second compressible member 170, moves towards inside of the third positioning hole 114a, and moves away from the fourth positioning hole 124a, to release the fixation of the first case 110 and the second case 120. A material of the second magnetically sensitive positioning pin 160 of this embodiment may be a material attracted by the magnetic force. In addition, as shown in FIG. 3, the first protruding block 112 and the second protruding block 114 are disposed symmetrically about a geometric centre of the first case 110, and as shown in FIG. 4, the first groove 122 and the second groove 124 are disposed symmetrically about a geometric centre of the second case 120.

Specifically, in this embodiment, the first case 110 has an accommodating groove 116, and the second case 120 has an opening 126. The light source 400 is disposed in the accommodating groove 116. When the second case 120 covers the first case 110, and the first protruding block 112 and the second protruding block 120 are disposed in the first groove 122 and the second groove 124, the light source 400 is confined in the accommodating groove 116 and is exposed by the opening 126, so as to emit light to the outside through the opening 126. It should be noted that, the light source 400 of this embodiment is a laser light source, but not limited thereto in other embodiments. In addition, the second case 120 of this embodiment has a pinhole 120a and a pinhole 120b. As shown in FIG. 5, when the first magnetically sensitive positioning pin 130 runs through the first positioning hole 112a and the second positioning hole 122a, an end of the first magnetically sensitive positioning pin 130 is aligned to the pinhole 120a, such that a screw 50 is screwed into the pinhole 120a and abuts against the first magnetically sensitive positioning pin 130, to further fix the position of the first magnetically sensitive positioning pin 130. In another aspect, as shown in FIG. 5, when the second magnetically sensitive positioning pin 160 runs through the third positioning hole 114a and the fourth positioning hole 124a, an end of the second magnetically sensitive positioning pin 160 is aligned to the pinhole 120b, such that a screw 60 is screwed into the pinhole 120b and abuts against the second magnetically sensitive positioning pin 160, to further fix the position of the second magnetically sensitive positioning pin 160.

Figure 6A:
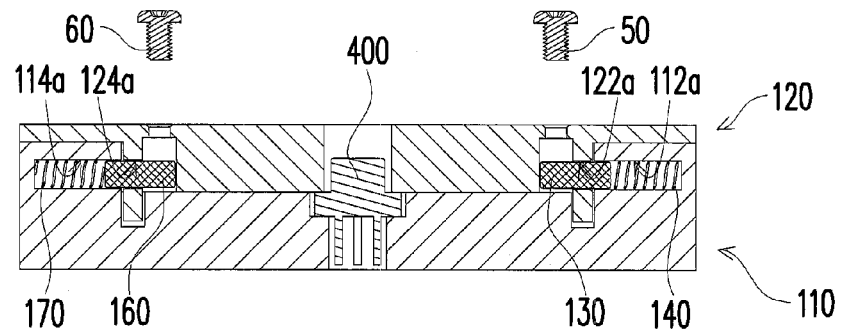
FIGS. 6A to 6C are detachment flow charts of the device housing in FIG. 1.
Figure 6B:
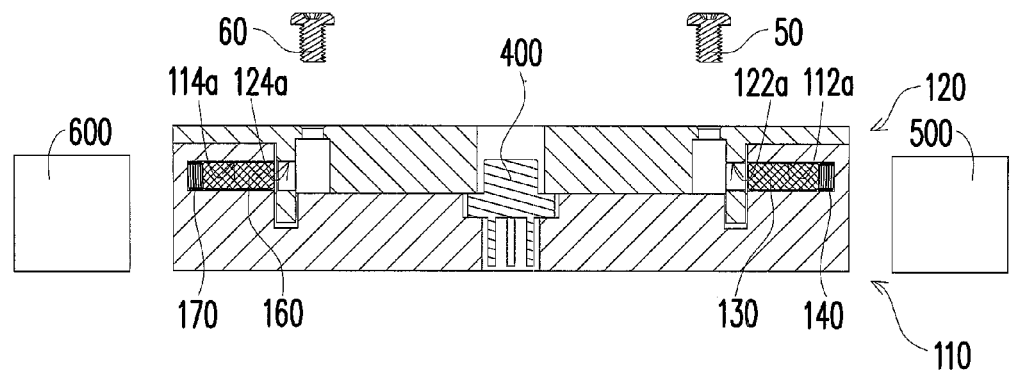
Figure 6C:
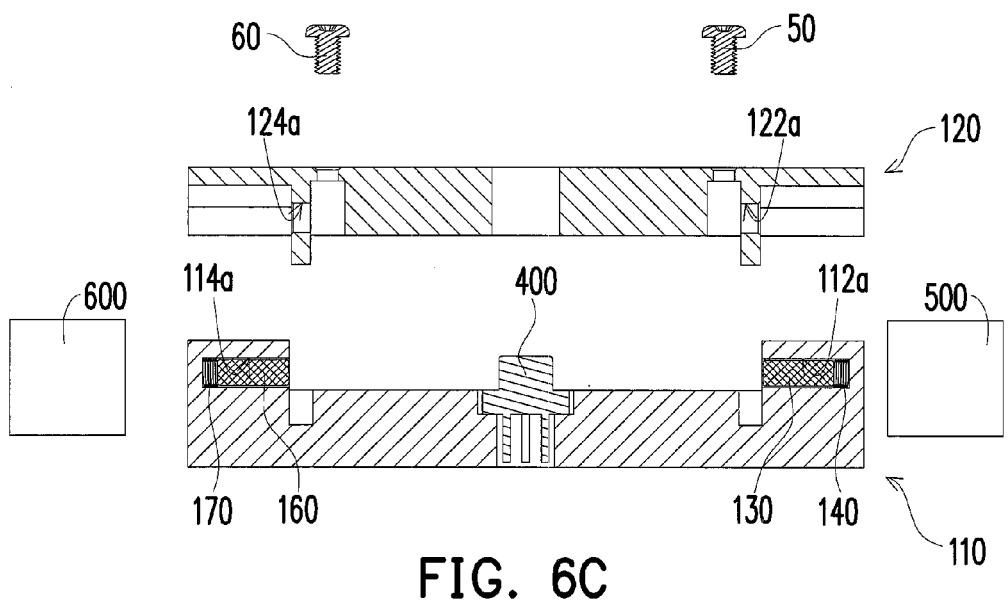

A detachment method of the device housing 100 will be described in detail with reference to the drawings below. FIGS. 6A to 6C are detachment flow charts of the device housing in FIG. 1. When a user intends to detach the device housing 100, the screw 50 and the screw 60 may be removed firstly, as shown in FIG. 6A. Then, as shown in FIG. 6B, the first magnetically sensitive positioning pin 130 and the second magnetically sensitive positioning pin 160 are attracted magnetically by a magnet 500 and a magnet 600. At this time, the first magnetically sensitive positioning pin 130 compresses the first compressible member 140, moves towards inside of the first positioning hole 112a, and moves away from the second positioning hole 122a, to release the fixation of the first case 110 and the second case 120 with the first magnetically sensitive positioning pin 130; and the second magnetically sensitive positioning pin 160 compresses the second compressible member 170, moves towards inside of the third positioning hole 114a, and moves away from the fourth positioning hole 124a, to release the fixation of the first case 110 and the second case 120 with the second magnetically sensitive positioning pin 160. Finally, as shown in FIG. 6C, the second case 120 is removed from the first case 110, such that the light source 400 could be taken out.

Through the arrangement manner described above, when the user intends to detach the first case 110 and the second case 120, a magnetic force needs to be applied to the first magnetically sensitive positioning pin 130 and the second magnetically sensitive positioning pin 160, such that the first magnetically sensitive positioning pin 130 compresses the first compressible member 140 and moves away from the second positioning hole 122a, and the second magnetically sensitive positioning pin 160 compresses the second compressible member 170 and moves away from the third positioning hole 124a, to release the fixation of the first case 110 and the second case 120 with the first magnetically sensitive positioning pin 130 and the second magnetically sensitive positioning pin 160. Therefore, the device housing 100 could not be easily detached without a magnet, thereby preventing the light source 400 from being taken out.

As shown in FIG. 5, the number of the accommodating groove 116 and the opening 126 of this embodiment is one, such that the device housing 100 accommodates the light source 400. However, the invention is not limited to this; in other embodiments, the number of the accommodating groove 116 may be multiple, and the accommodating grooves 116 are formed on the first case 110 in an array; and correspondingly, the number of the opening 126 may also be multiple, and the openings 126 are formed on the second case 120 in an array, such that the device housing 100 accommodates the multiple light sources 400.

Moreover, referring to FIGS. 3 and 4, an end of the first protruding block 112 is substantially even with an edge 118 of the first case 110, and an end of the first groove 122 is substantially even with an edge 128 of the second case 120, such that a shape of the device housing 100 is smoother. However, the invention is not limited to this; in other embodiments, the first protruding block 112 may protrude or recess from the edge 118 of the first case 110, and the first groove 122 may also protrude or recess from the edge 128 of the second case 120. In addition, the second protruding block 114 may also be even with, protrude, or recess from an edge 119 of the first case 110, and the second groove 124 may also be even with, protrude, or recess from an edge 129 of the second case 120.

Figure 7:
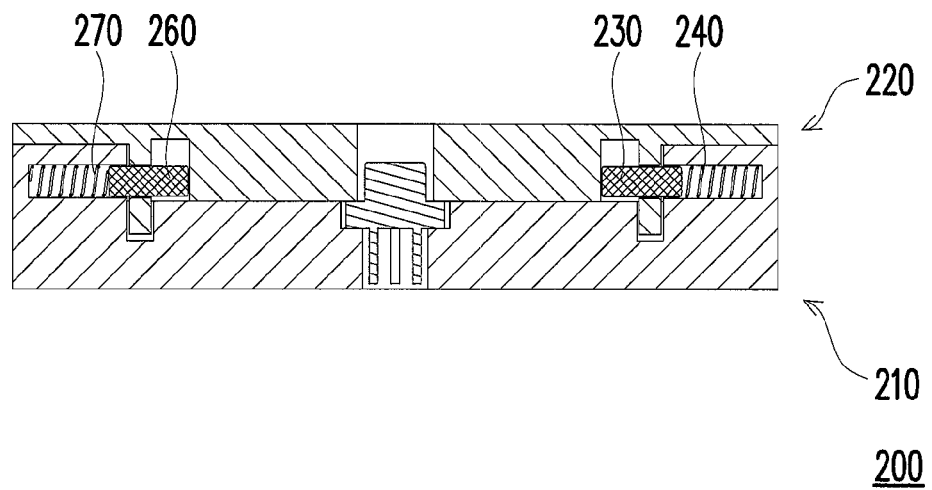
FIG. 7 is a cross-sectional view of a device housing according to another embodiment of the invention.

FIG. 7 is a cross-sectional view of a device housing according to another embodiment of the invention. Comparing FIG. 7 with FIG. 5, the device housing 100 in FIG. 5 has the pinhole 120a and the pinhole 120b, and the first magnetically sensitive positioning pin 130 and the second magnetically sensitive positioning pin 160 are positioned through the screw 50 and the screw 60 respectively; In FIG. 7, a second case 220 of the device housing 200 does not have a pinhole and thus, when the second case 220 covers a first case 210, a first magnetically sensitive positioning pin 230 and a second magnetically sensitive positioning pin 260 are positioned through a first compressible member 240 and a second compressible member 270.

Figure 8:
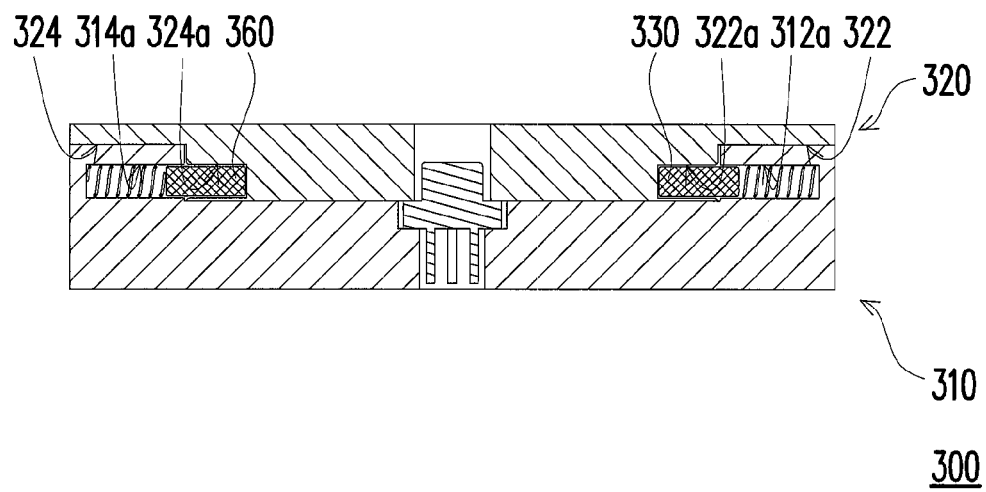
FIG. 8 is a cross-sectional view of a device housing according to another embodiment of the invention.
Figure 9:
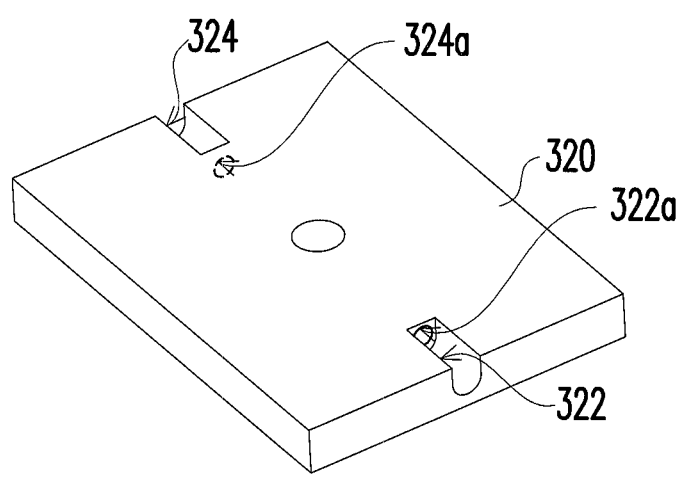
FIG. 9 is a three-dimensional view of a second case in FIG. 8.

Moreover, referring to FIG. 4, the second case 120 of the embodiment has a lug 122b in the first groove 122, and the second positioning hole 122a is formed on the lug 122b. Similarly, the second case 120 has a lug 124b in the second groove 124, and the fourth positioning hole 124a is formed on the lug 124b. FIG. 8 is a cross-sectional view of a device housing according to another embodiment of the invention. FIG. 9 is a three-dimensional view of a second case in FIG. 8. Referring to FIGS. 8 and 9, in a device housing 300 of this embodiment, a second case 320 does not have any lug in a first groove 322 and a second groove 324; and a second positioning hole 322a and a fourth positioning hole 324a are respectively formed on an inner wall of the first groove 322 and an inner wall of the second groove 324. A first magnetically sensitive positioning pin 330 runs through a first positioning hole 312a and the second positioning hole 322a, and a second magnetically sensitive positioning pin 360 runs through a third positioning hole 314a and the fourth positioning hole 324a, such that the second case 320 is positioned on the first case 310.

Based on the above, in the embodiments of the invention, a first magnetically sensitive positioning pin runs through a first positioning hole and a second positioning hole, and is positioned by a first compressible member. When a user intends to detach the first case and the second case, a magnetic force needs to be applied to the first magnetically sensitive positioning pin, such that the first magnetically sensitive positioning pin compresses the first compressible member and moves away from the second positioning hole, to release the fixation of the first case and the second case. In this manner, the device housing cannot be easily detached, thereby preventing the light source from being taken out.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims of invention may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A device housing, comprising:
    a first case, comprising a first protruding block, wherein the first protruding block comprises a first positioning hole;
    a second case, comprising a first groove, wherein the first groove comprises a second positioning hole, and when the first protruding block is disposed in the first groove, the first positioning hole is aligned to the second positioning hole;
    a first magnetically sensitive positioning pin, running through the first positioning hole and the second positioning hole, to position the second case on the first case; and
    a first compressible member, disposed in the first positioning hole, wherein the first compressible member is disposed between an inner wall of the first positioning hole and the first magnetically sensitive positioning pin, and when a first magnetic force is applied to the first magnetically sensitive positioning pin, the first magnetically sensitive positioning pin compresses the first compressible member and moves away from the second positioning hole.

2. The device housing according to claim 1, wherein the first case comprises at least one accommodating groove, the second case comprises an opening; a light source is disposed in the accommodating groove, and the opening exposes the light source.

3. The device housing according to claim 2, wherein the light source is a laser light source.

4. The device housing according to claim 1, wherein the second case comprises a pinhole; when the first magnetically sensitive positioning pin runs through the first positioning hole and the second positioning hole, an end of the first magnetically sensitive positioning pin is aligned to the pinhole, and a screw is screwed into the pinhole and abuts against the first magnetically sensitive positioning pin.

5. The device housing according to claim 1, wherein the first compressible member is a spring or an extension rod.

6. The device housing according to claim 1, wherein the second positioning hole is formed on an inner wall of the first groove.

7. The device housing according to claim 1, wherein the second case comprises a lug in the first groove, and the second positioning hole is formed on the lug.

8. The device housing according to claim 1, wherein an end of the first protruding block is even with an edge of the first case, and an end of the first groove is even with an edge of the second case.

9. The device housing according to claim 1, further comprising:
    a second magnetically sensitive positioning pin, wherein the first case further comprises a second protruding block, the second protruding block comprises a third positioning hole, the second case further comprises a second groove, the second groove comprises a fourth positioning hole, when the second protruding block is disposed in the second groove, the third positioning hole is aligned to the fourth positioning hole, and the second magnetically sensitive positioning pin runs through the third positioning hole and the fourth positioning hole, to position the second case on the first case; and
    a second compressible member, disposed in the third positioning hole, wherein the second compressible member is disposed between an inner wall of the third positioning hole and the second magnetically sensitive positioning pin, and when a second magnetic force is applied to the second magnetically sensitive positioning pin, the second magnetically sensitive positioning pin compresses the second compressible member and moves away from the fourth positioning hole.

10. The device housing according to claim 9, wherein the first protruding block and the second protruding block are symmetrical about a geometric centre of the first case, and the first groove and the second groove are symmetrical about a geometric centre of the second case.

* * * * *